Oct. 9, 1923. 1,470,107
A. L. RUTHVEN
COMBINATION AUTOMATIC AND MANUALLY OPERABLE AIR BRAKE, POWER CONTROL,
AND ALARM SYSTEM
Filed June 15, 1917    11 Sheets-Sheet 2
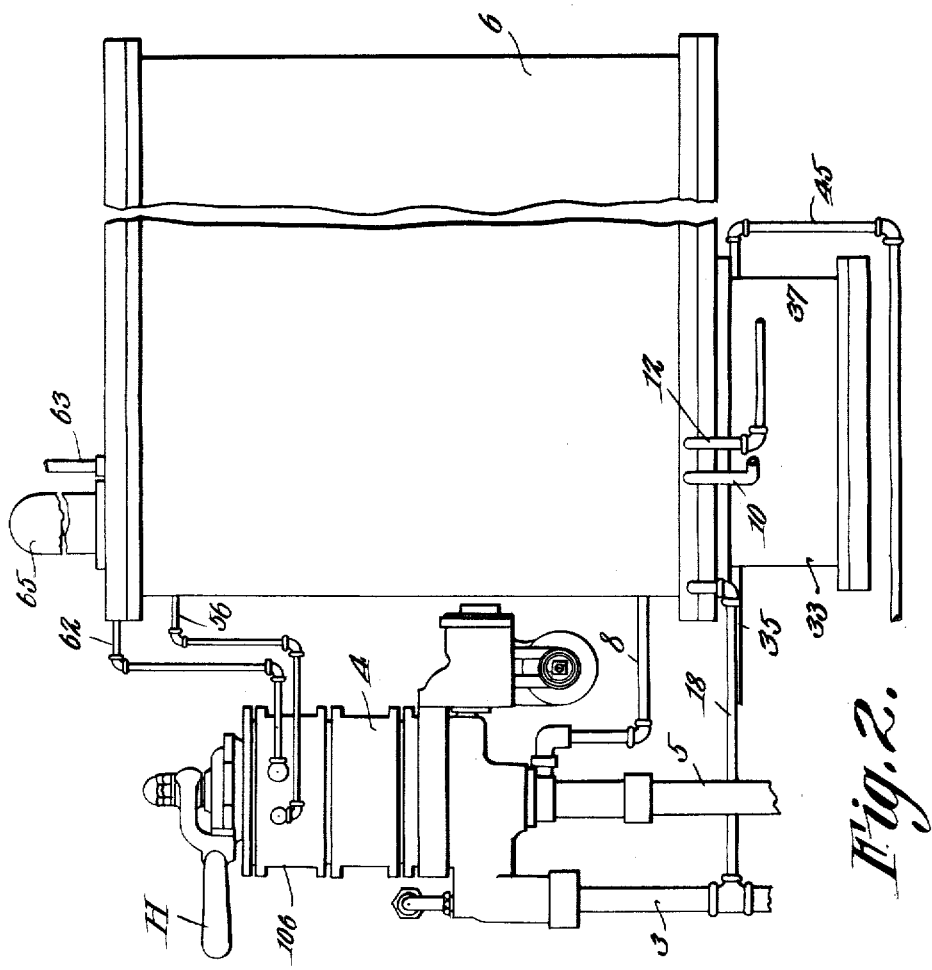

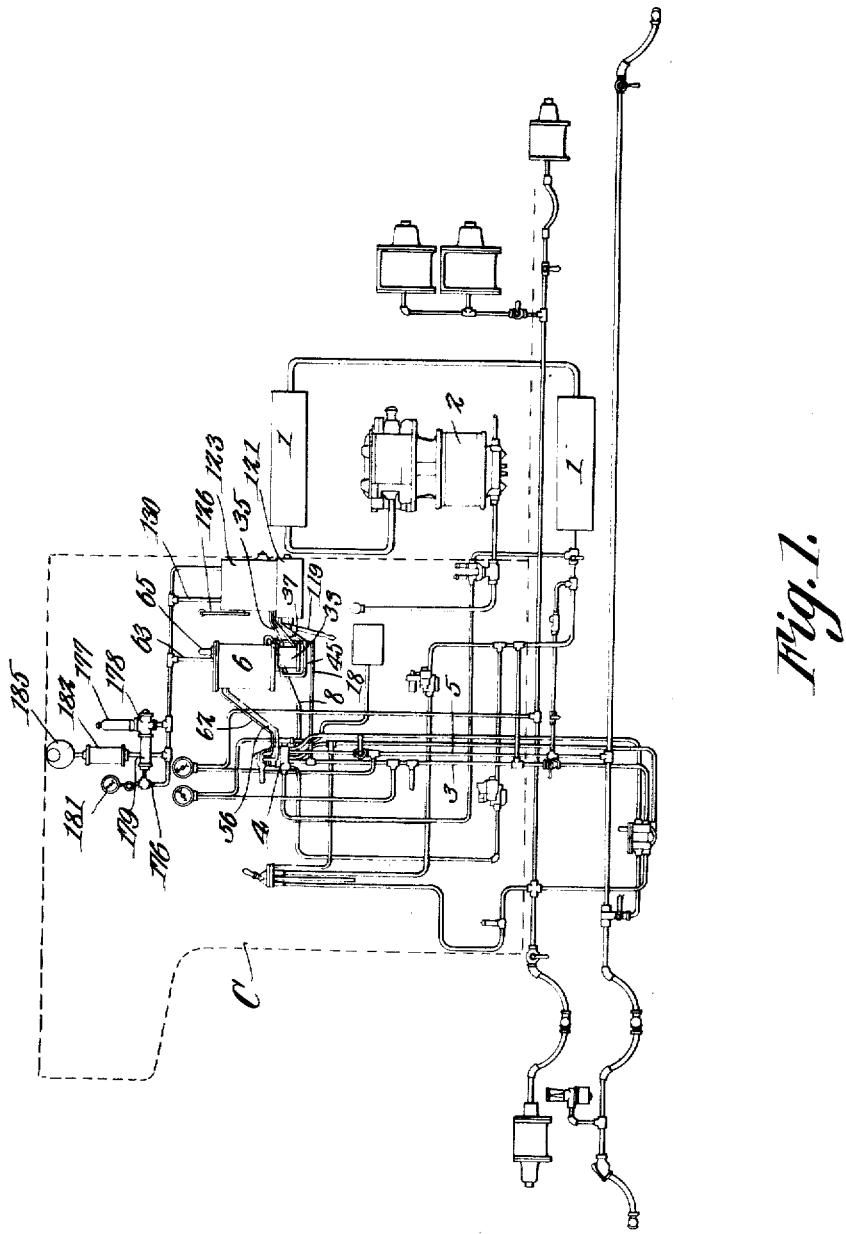

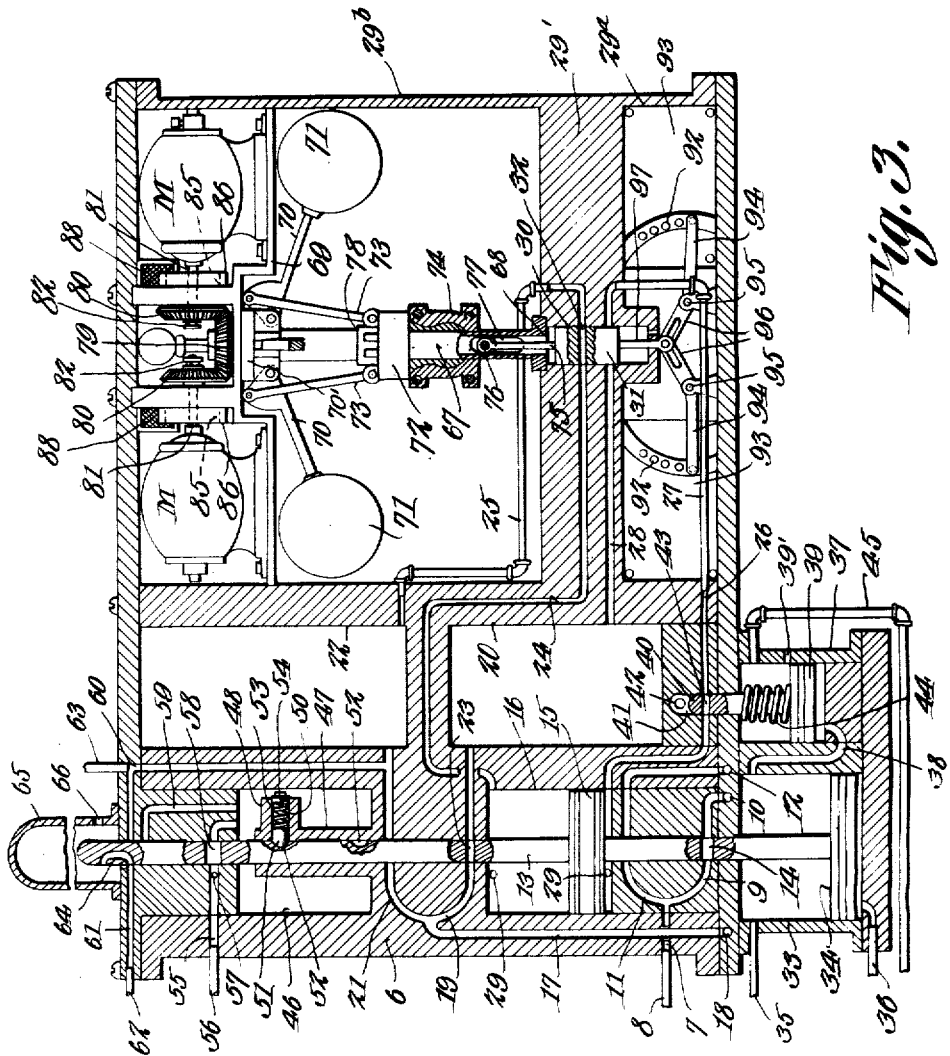

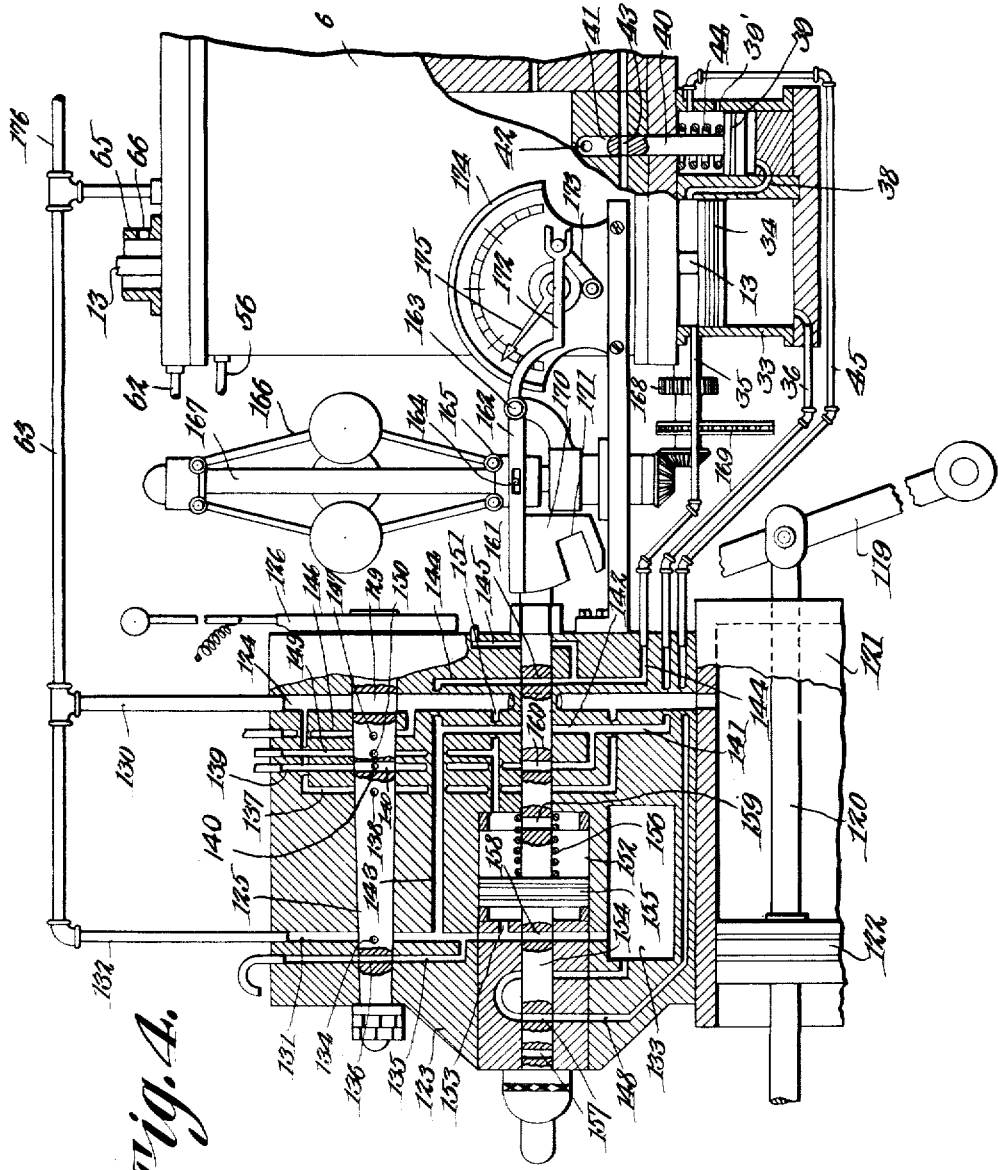

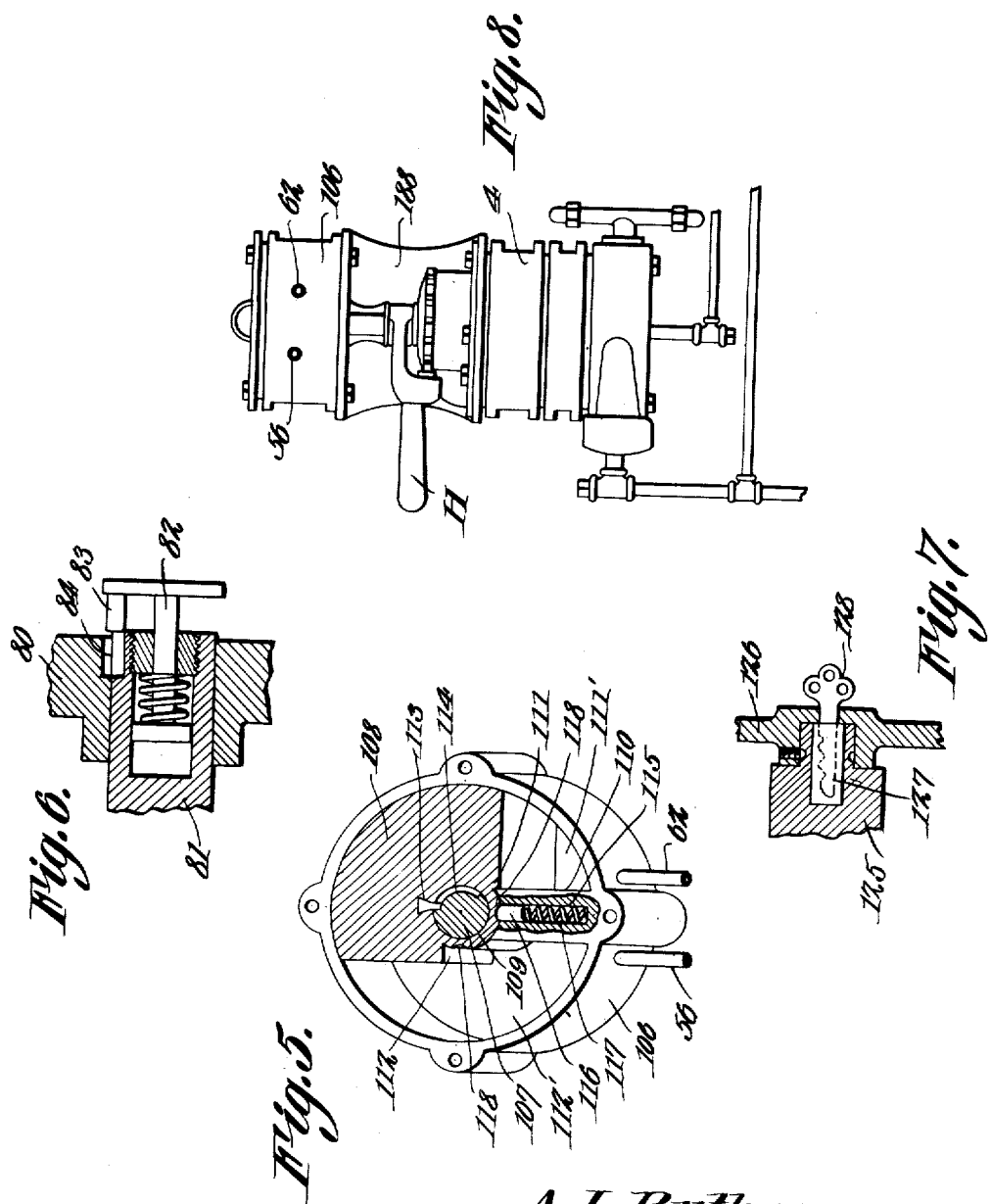

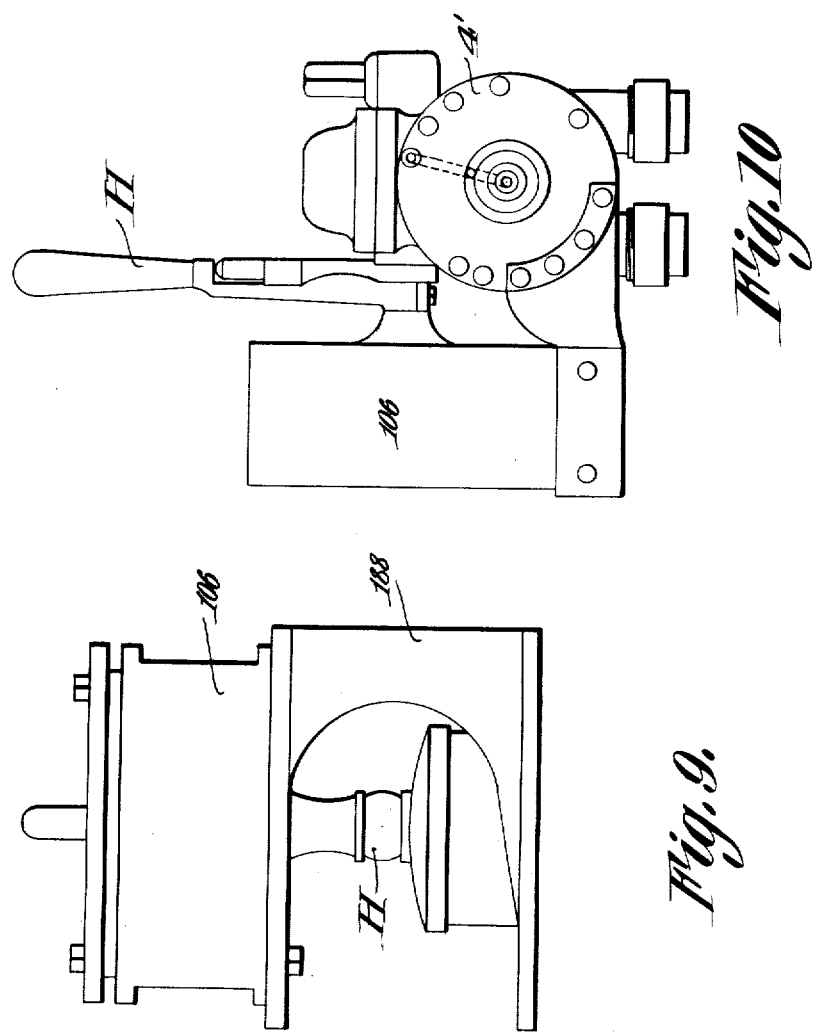

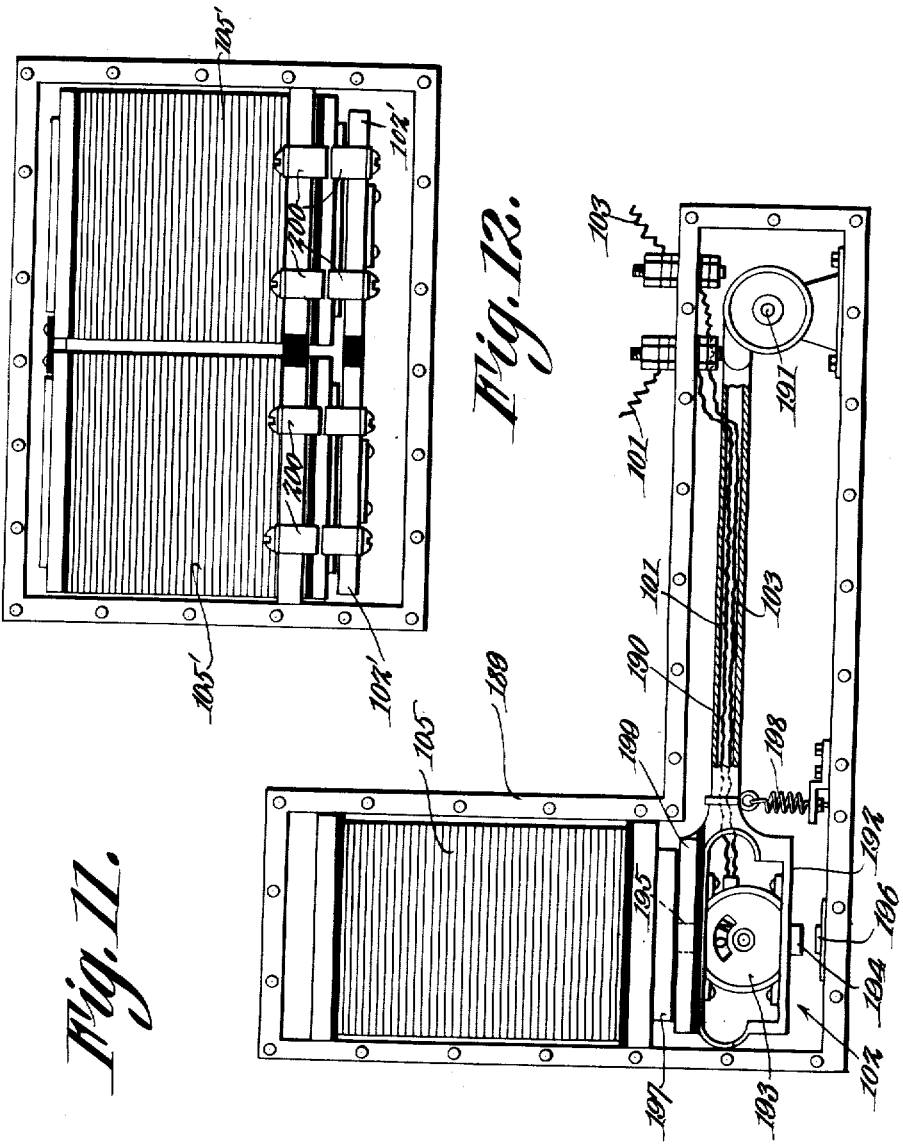

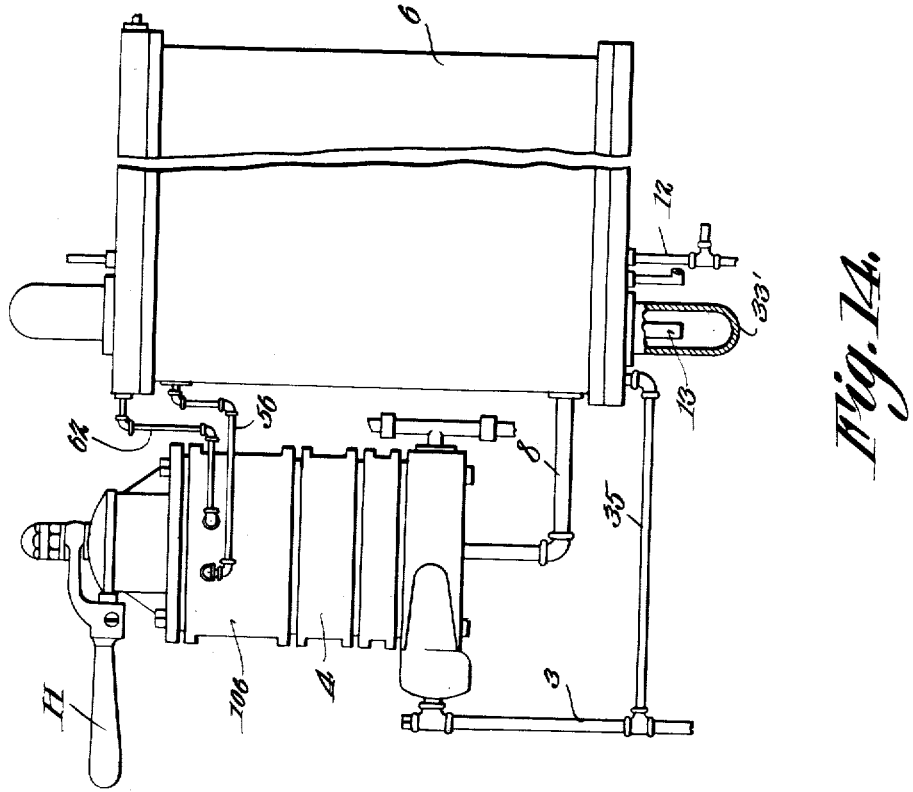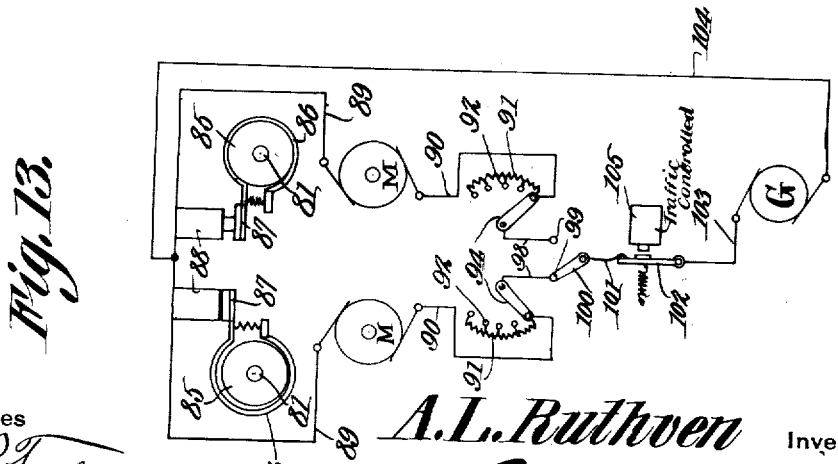

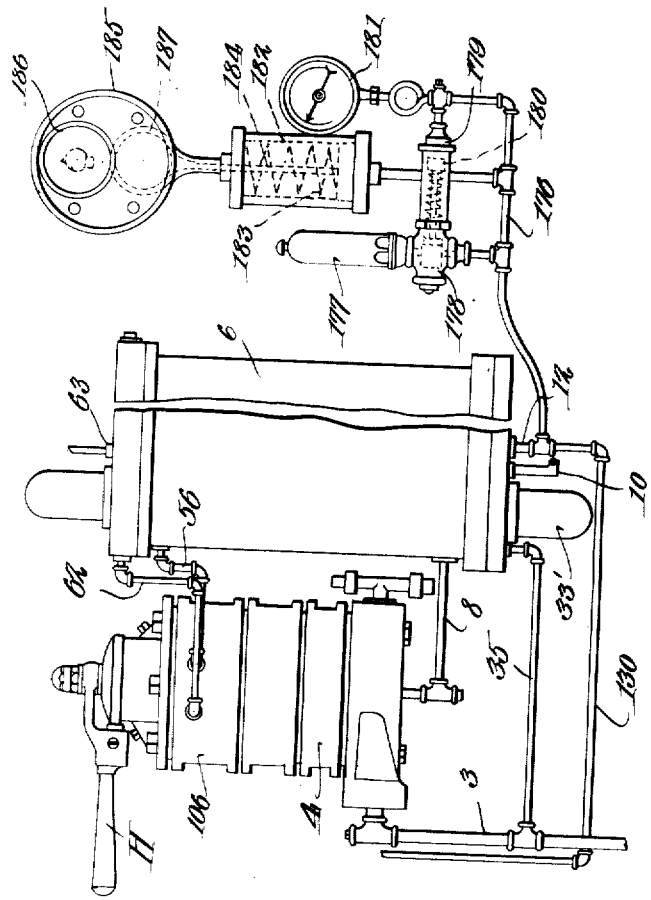

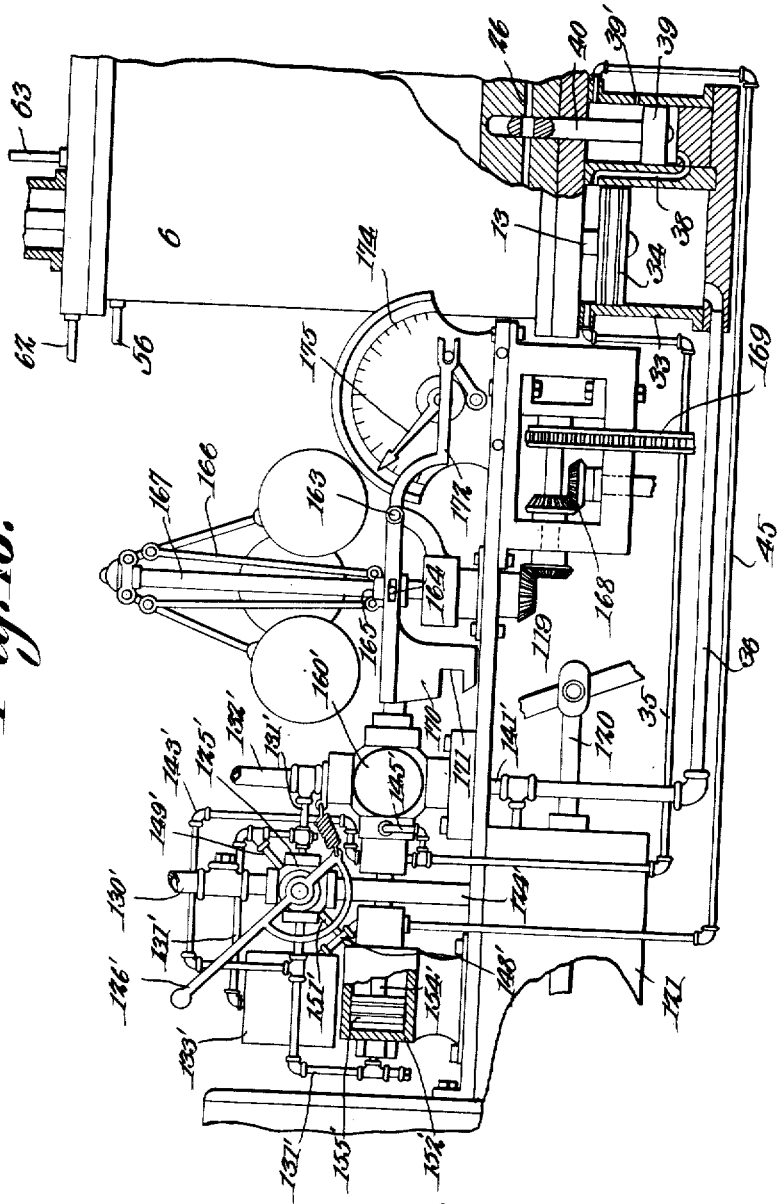

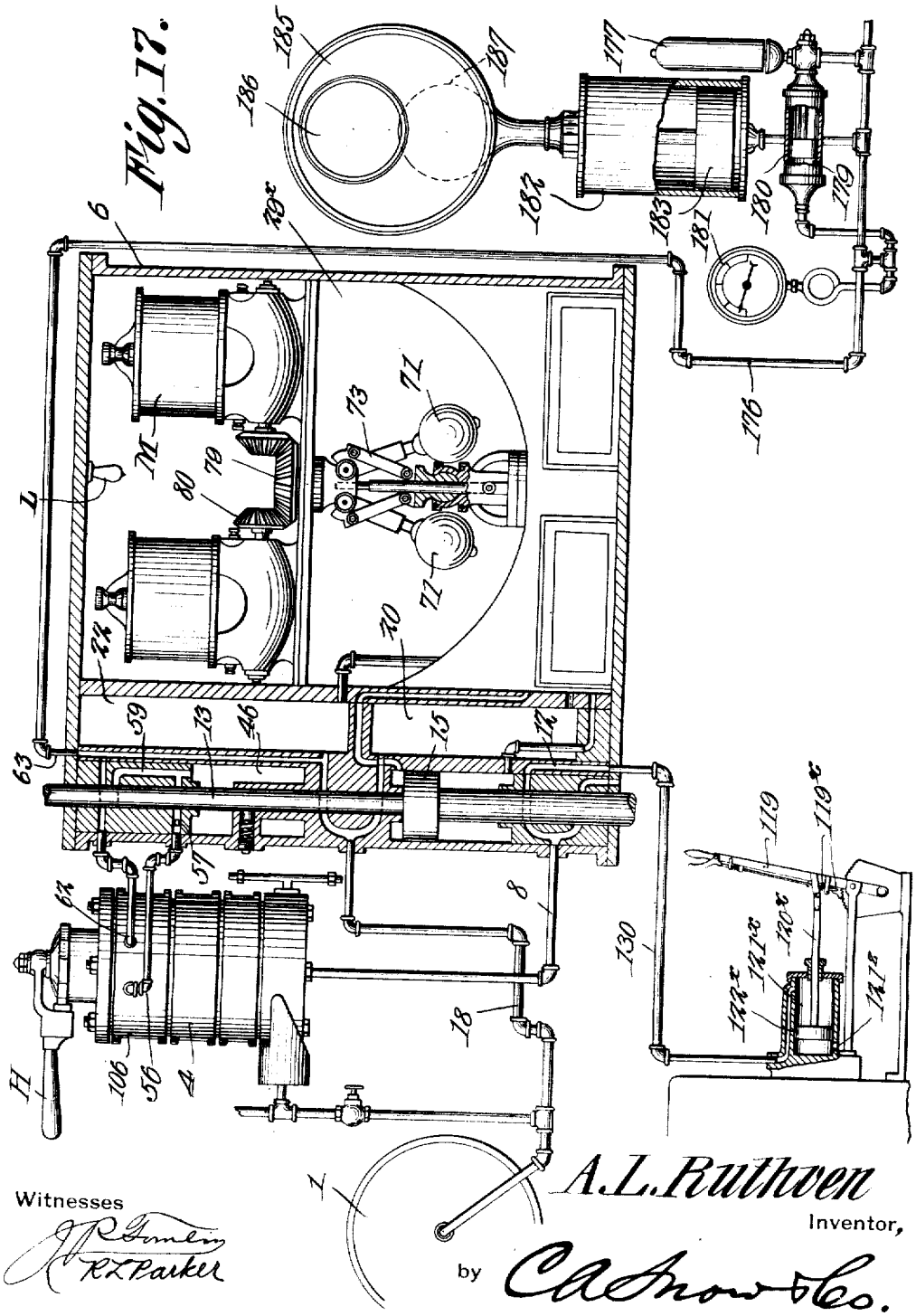

Patented Oct. 9, 1923.

1,470,107

UNITED STATES PATENT OFFICE.

ALFRED L. RUTHVEN, OF BUFFALO, NEW YORK, ASSIGNOR TO SIMPLEX TRAIN CONTROL CO., INC., OF ROCHESTER, NEW YORK, A CORPORATION OF NEW YORK.

COMBINATION AUTOMATIC AND MANUALLY-OPERABLE AIR BRAKE, POWER CONTROL, AND ALARM SYSTEM.

Application filed June 15, 1917. Serial No. 175,018.

*To all whom it may concern:*

Be it known that I, ALFRED L. RUTHVEN, a citizen of the United States, residing at Buffalo, in the county of Erie and State of New York, have invented a new and useful Combination Automatic and Manually-Operable Air Brake, Power Control, and Alarm System, of which the following is a specification.

The present invention appertains to train control systems or apparatus, and aims to provide a novel and improved apparatus for controlling a steam propelled train or a vehicle using any other propulsion or motive power.

It is the object of the invention to provide in a train controlling apparatus, novel means for automatically controlling the propelling means and braking means of the vehicle, in order that in case of emergency or danger, the motive or propelling power is cut off and the brakes applied, whereby to bring the vehicle to a halt for avoiding a wrench or other accident.

The invention includes novel means for actuating the power interrupting device, such as the throttle of a steam engine, controller of an electrically propelled vehicle, or the like; novel means for automatically operating the engineer's air brake valve and applicable to ordinary engineer's air brake valves to convert the same into a combination automatic and manually operable brake valve; novel means whereby the vehicle after entering or reaching a danger zone can proceed at a slow rate of speed, say eight or ten miles per hour, under caution conditions, the vehicle being stopped should the speed allowed be exceeded; novel signalling means; and novel means for operating the controlling valve or device when the vehicle is proceeding under caution conditions after reaching or traveling in the danger zone.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a diagrammatic view of the controlling apparatus as installed in a locomotive air brake equipment.

Figure 2 is an elevation of the controlling valve or device, and engineer's brake valve.

Figure 3 is a median section of the controlling valve or device portions being shown in elevation.

Figure 4 is a view, partly in section and partly in elevation, illustrating the power interrupting device and speed limit controlling device.

Figure 5 is a perspective view of the automatic attachment for the engineer's brake valve, portions being shown in section.

Figure 6 is a sectional detail illustrating one of the keys for the motor operated gears.

Figure 7 is a sectional detail illustrating the key controlled means for bringing the speed limit controlling means into operation.

Figure 8 is an elevation illustrating a different manner of assembling the automatic attachment to an engineer's brake valve.

Figure 9 is an enlarged elevation of the attachment illustrated in Figure 8, the line of view being at right angles to the line of view in Figure 8.

Figure 10 is an elevation showing the automatic attachment applied in a different manner to a different type of engineer's brake valve.

Figure 11 is an elevation of a relay used in the system, portions being shown in section.

Figure 12 is an elevation of a modified form of relay which can be used.

Figure 13 is a diagrammatical view of the motor circuits controlled by the relay.

Figure 14 is a view similar to Figure 2 illustrating a modification.

Figure 15 is a view similar to Figures 2 and 14 illustrating further modifications.

Figure 16 is an elevation illustrating a modified form of power interrupting device and speed limit controlling device, portions being shown in section.

Figure 17 is a fragmental elevation of another embodiment of the invention.

The present apparatus is used in combination with an ordinary automatic air brake equipment for a locomotive, as illustrated in Figure 1, although it is to be understood at the outset, that the apparatus can be used in conjunction with the air brake equipment of a vehicle propelled by steam, electricity or other motive power, which is interrupted through the medium of a throttle, controller, or the like. The air brake equipment illustrated in Figure 1 includes the usual main reservoirs 1 supplied with compressed air or pressure fluid from a pump 2 which is operated by steam upon a steam locomotive, but which can be operated in any other suitable manner, a feed pipe 3 connecting the main reservoirs and the engineer's brake valve 4 from which the brake or train pipe 5 extends to the cars of the train. The brake valve 4 is operable for normally establishing communication between the feed pipe 3 and brake pipe 5 whereby pressure fluid will flow into the brake pipe for releasing the brakes, and the valve 4 is operable for cutting off communication between the pipes 3 and 5 and bringing the pipe 5 into communication with the atmosphere to bleed the brake pipe or let the pressure fluid escape therefrom, whereby the brakes are automatically applied for stopping the train. The other parts of the air brake equipment illustrated need no description, since they do not form a part of the present invention, and are well understood in the art.

The present apparatus includes a controlling device or valve, embodying a casing 6 having upper and lower heads or covers, reference being had to Figure 3 for a detailed illustration of the interior parts. This casing 6 has an exhaust passage 7 extending from one side and connected by an exhaust pipe 8 with the exhaust port of the engineer's brake valve 4, whereby when the brake valve is operated to connect the brake pipe 5 with the exhaust port, the pressure fluid will flow from the brake pipe through the exhaust pipe 8 into the passage 7, said passage being provided with branch passages 9 and 11, and the branch passage 9 communicates with a pipe 10 which opens into the atmosphere, while the passage 11 communicates with a pipe 12 connected to the casing for conducting off the exhaust pressure fluid under certain conditions. A vertical rod 13, providing the main controlling valve, is slidable vertically through the casing 6 and intersects the branch passages 9 and 11, said rod 13 being provided with a port 14 brought into registration with the passage 9 when the rod is in lowered position, and brought into registration with the passage 11 when the rod is in its raised position. When one of the branch passages is opened by the port 14, the other is closed.

As a means for automatically operating the valve rod 13, the casing 6 is provided with a cylinder 16 in which a piston 15 works, said piston being secured to or carried by the rod 13. The casing 6 has a passage 17 connected by a pipe 18 with the feed pipe 3 leading to the main reservoirs (see Figures 1 and 2), whereby live pressure fluid is supplied into the passage 17 at main reservoir pressure, and the passage 17 has branch passages 19 and 21. The branch passage 19 communicates with a chamber or auxiliary reservoir 20 with which the casing 6 is provided, while the passage 21 communicates with a second pressure fluid chamber or auxiliary reservoir 22 in the casing 6. The rod 13 has a port 23 registrable alternately with the branch passages 19 and 21, whereby either of said passages can be opened while the other is closed, the port 23 registering with the passage 19 when the rod 13 is lowered and registering with the passage 21 when the rod is raised, said rod being normally in lowered position. The casing 6 has a passage 24 communicating with the upper end of the cylinder 16 which passage is connected by a pipe 25 with the pressure fluid chamber 22. The casing 6 has a passage 26 communicating with the lower end of the cylinder 16 and connected by a pipe 27 with a passage 28 communicating with the chamber 20, whereby the opposite ends of the cylinder 16 are connected with the respective chambers or reservoirs 20 and 22, pressure fluid being stored in said chambers for moving the piston 15 and rod 13. The casing 6 has vent apertures 29 communicating with the ends of the cylinder 16, and permitting the pressure fluid to escape, but not with sufficient volume to relieve the pressure to any appreciable extent, but permitting the piston 15 to be moved in either direction, the air being forced out ahead of the piston through the respective vent apertures 29. The passages 24 and 28 extend within a horizontal partition 29' with which the casing 6 is provided between lower and upper chambers 29ª and 29ᵇ, and said partition has a bore 30 intersecting said passages 24 and 28 and slidably receiving a vertically movable valve 31 having a port 32 adapted to be brought alternately into registration with the passages 24 and 28, whereby either of them can be opened while the other is closed, said valve 31 being normally raised during working conditions to bring the port 32 into registration with the passage 24 so that the passage 28 is closed.

When the speed limit controlling device is used, a cylinder 33 is secured to the bottom of the casing 6 below the rod 13 and receives the lower terminal of said rod, a piston 34 being secured to the said terminal of the rod and sliding within the cylinder 33. A pipe 35 is connected to the cylinder 33 to communicate with the upper end thereof, while a pipe 36 is connected to said cylinder to communicate with its lower end. United with the cylinder 33 is a second vertical cylinder 37 which has its lower end connected by a passage 38 with the upper end of the cylinder 33. A piston 39 works within the cylinder 37 and has an upwardly projecting valve stem 40 slidably received by a bore 41 with which the casing 6 is provided, said bore 41 intersecting the passage 26. The bore 41 has a vent aperture 42 for the egress and ingress of air, to permit the stem 40 to slide in the bore 41 without interference. The stem 40 is provided with a port 43 to register with the passage 26 when the piston 39 is lowered, and when the piston is raised, the stem 40 will close the passage 26 to prevent the flow of pressure fluid therein. The cylinder 37 has a port 39' between its ends which is uncovered when the piston 39 is in its lowered position, but which is covered by the piston when it is raised. A coiled wire compression spring 44 surrounds the stem 40 and is confined between the piston 39 and the casing 6 to normally depress said piston when it is free to move downwardly, and a pipe 45 is connected to the cylinder 37 to communicate with the upper end thereof.

The casing 6 has a third chamber or auxiliary reservoir 46 through which the rod 13 extends, and the casing has an upstanding sleeve 47 within the chamber 46 through which the rod 13 slides, said sleeve being provided with a boss 48 having a bore 50 in which a detent 51 is slidable to engage either of a pair of notches 52 with which the rod 13 is provided. A compression spring 53 is confined between the detent 51 and a plug 54 screwed into the bore 50, and the detent 51 in engaging in the notches 52 will hold the rod 13 in either raised or lowered position, to prevent an accidental movement thereof, but to permit the rod to be moved upwardly or downwardly by force. A passage 55 with which the casing 6 is provided communicates with the chamber 46 and is intersected by the rod 13, and a pipe 56 is connected to the casing to communicate with the passage 55. A vent aperture 57 extends from the passage 55 between the pipe 56 and rod 13, to permit of a restricted flow of the pressure fluid to the atmosphere. The rod 13 has a port 58 which registers with the passage 55 when the rod is lowered, and when the rod is raised, the passage 55 is closed. The casing has a passage 59 also communicating with the chamber 46 and extending to the rod 13, and a passage 60 communicating with the passage 21 and chamber 22 and extending to the rod 13 adjacent to the passage 59, and also a passage 61 extending to the rod 13 opposite the passages 59 and 60 and communicating with a pipe 62 attached to the casing. When the rod 13 is raised, the port 58 establishes communication between the passage 61 and both passages 59 and 60 with which the port 58 is registrable. A pipe 63 is connected to the casing 6 to communicate with the passage to 60, and the rod 13 has a port or passage 64 to register with the passage 61 when the rod is in lowered position, whereby to permit of the escape of pressure fluid from the pipe 62 and passage 61. A cap or housing 65 is secured to the top of the casing 6 to enclose the upper end of the rod 13, and is provided with a vent aperture or port 66 through which the pressure fluid can flow from the port 64 to the atmosphere.

The valve 31 is controlled by a governor mounted within the chamber 29$^b$, and for this purpose a vertical tubular shaft 67 is disposed centrally within the chamber 29$^b$ and has its lower end secured, as at 68, upon the partition 29', and the upper end of the shaft 67 is connected to the top of the casing in any suitable manner, the shaft 67 extending upwardly through a bracket 69 mounted within the upper portion of said chamber 29$^b$. Any suitable number of governor arms 70 are pivotally connected with a collar 70' rotatable upon the shaft 67 and within the bracket 69, and the free ends of said arms carry weights 71. A collar 72 is rotatable upon the shaft 67 and is connected by links 73 with the governor arms 70, whereby when the governor arms are raised and lowered, the collar 72 is moved likewise. A second collar 74 is slidable but not rotatable upon the shaft 67, and has a swivel or ball and socket connection with the collar 72 to be raised and lowered therewith, but enabling the collar 72 to rotate. The valve 31 has an upwardly projecting stem 75 entering the tubular shaft 67 and provided with a pin 76 extending outwardly through a longitudinal slot 77 with which the shaft 67 is provided, said pin 76 being engaged with the collar 74, whereby the valve 31 is raised and lowered with the collar 74. Thus, when the governor is in operation, the arms 70 being thrown upwardly, will raise the valve 31 to bring its port 32 into register with the passage 24, and when the governor is stopped, so that its arms swing downwardly, the valve 31 is moved downwardly to bring its port 32 into register with the passage 28. A stop 78 is carried by the shaft 67 above the collar 72 to limit the upward movement thereof, whereby to limit the expansion of the governor even though the speed of rotation thereof is increased above a certain amount.

As a means for actuating the governor, a pair of motors M, preferably oppositely disposed, are carried by the bracket 69, and a bevel gear 79 is secured to and rotatable with the collar or hub 70' above the bracket 69, and meshes with bevel gears 80 mounted upon the armature shafts 81 of the motors. Keys are employed for rendering the bevel gears 80 fast with the armature shafts, and for loosening said gears, so that when one motor fails, the other can be brought into operation for operating the governor. Thus, spring pressed members 82 are carried by the ends of the armature shafts 81, as seen in Figures 6, and have keys 83 receivable by key seats 84 with which the shafts 81 and gears 80 are provided. Thus, when the members 82 are retracted and turned, the keys 83 are removed from the seats 84, so that the gears 80 can turn loosely upon the shafts 81, and by introducing one of the keys 83 into the respective seat 84, the respective gear is made fast to the armature shaft in order that the motor may be operable for rotating the governor, it being apparent that if one motor fails, its gear 80 can be disconnected from the armature shaft, and the other gear 80 can be keyed to the armature shaft of the other motor.

As a means for stopping the armature shafts 81 of the motors M quickly, brake drums 85 are secured upon said armature shafts, reference being had to Figures 3 and 13, and brake bands 86 surround said brake drums and are spring pressed in order that when they are released, they will embrace the drums 85 to exert a braking action for stopping the armature shafts. The brake bands 86 carry armatures 87 under the influence of electromagnets 88, which are normally energized during the operation of the motors, it being understood that when one motor is in operation, the respective magnet 88 is energized to release the corresponding brake band 86.

The electrical circuits in which the motors M and electromagnets 88 are disposed, are illustrated in Figure 13, and include conductors 89 connected to certain terminals of the magnets 88 and connected to certain terminals of the motors, M, and conductors 90 which are connected to the other terminals of the motors and to starting rheostats for the motors. A rheostat is provided for each motor, and the rheostats include suitable slabs 93 (see Figure 3) mounted in the chamber 29ª below the partition 29' and arcuate series of contacts 92 carried by said slabs and having suitable resistance 91 connected thereto. Switch arms 94 are pivotally mounted, as at 95, so that their free ends are arranged to wipe over the contacts 92 of the two sets, and said switches 94 have arms 96 connected to a downwardly projecting stem 97 carried by the valve 31. When the governor is stopped, the stem 97 being moved downwardly with the valve 31 will swing the switches 94 upwardly to the uppermost contacts 92, thus interposing the entire resistances 91 in the two motor circuits, so that the electrical energy in either motor circuit must traverse the resistance 91, thereby providing for the slow starting operation of the motor, but as the motor accelerates in motion, the governor arms 70 are gradually moved upwardly, thereby raising the valve 31 and stem 97, and swinging the switches 94 downwardly, thereby cutting out the resistance step-by-step, to assure of the gradual starting and acceleration of the motor. This provides for the effective starting of the motors, without sudden strains or jars. Conductors 98 (see Figure 13) are connected to the switches 94 and to a pair of contacts 99 of a circuit changing switch 100 which is connected by a conductor 101 to a normally closed spring pressed relay armature switch 102, which is in turn connected by a conductor 103 to a generator or other source of electrical energy G. The generator G or other source of electrical energy supplies the energy constantly during the use of the apparatus, which must be the case, in order to operate the corresponding motor M and governor independent of the vehicle speed or motion. The other terminal of the generator G is connected by a conductor 104 to the other terminals of the magnets 88, thereby completing the two motor circuits. A relay magnet 105 normally attracts the armature switch 102, and is disposed in a low voltage circuit controlled from the track by any suitable mechanism, or controlled by a wireless apparatus, or the like, it being preferable to use a normally energized relay magnet 105 although a normally deenergized relay can be used, as will be apparent to those skilled in the art. When the magnet 105 is energized, with the arrangement illustrated in Figure 13, the switch 102 is held closed, thereby keeping the respective motor circuit closed, which motor circuit carries sufficient voltage to assure of the operation of the motor and governor. The switch 100 can be operated for changing from one motor circuit to the other, in connection with the keys 83 (see Figure 6) for changing the connection between the governor and motors. It is evident that when the magnet 105 is deenergized, the armature switch 102 is released, and will immediately open the motor circuit, so that the motor stops, and the respective magnet 88 being simultaneously deenergized, will result in the brake band 86 being applied for stopping the armature shaft immediately, to avoid the spinning of the governor and to bring it to a quick stop.

An automatic attachment for the engineer's brake valve 4 is illustrated in detail in Figure 5, and includes a cylindrical casing 106 assembled with the engineer's brake valve in any suitable manner. As illustrated in Figure 2, the casing 106 is below the handle H of the valve, whereas in Figures 8 and 9, the casing 106 is above the handle H, being carried by a bracket 188 attached to the body of the valve. As illustrated in Figure 10, the casing 106 has its axis in a horizontal position, instead of a vertical position, and the casing is located at one side of the brake valve 4' which is of special construction and used in certain air brake equipment. The stem 107 (see Figure 5) which carries the handle H extends through the casing 106 centrally thereof, and a segmental-shaped member or piston 108 snugly fitting the walls of the casing 106 is provided with an aperture 109 through which the stem 107 extends. The casing 106 has a radial abutment or partition 110 united with one wall thereof and having its inner end abutting the member 108 to define two chambers or compartments 111' and 112' between the abutment 110 and the opposite ends of the member 108. Said member 108 has shoulders or stops 111 and 112 to contact with the abutment 110 as the member 108 is moved to its opposite positions, said member being adapted to oscillate about the stem or spindle 107 as a pivot. A key or lug 113 is carried by the member 108 and projects within its bore or aperture 109, and the stem 107 is provided with an arcuate slot 114 receiving the lug 113, whereby to permit of a limited oscillatory movement of the stem 107 and member 108, whereby the stem 107 can normally be oscillated by the engineer, without interference, for applying and releasing the brakes. The abutment 110 has a bore 115 in which a detent 116 is slidable, being pressed against the member 108 by means of a compression spring 117 confined within the bore 115 behind the detent, and the member 108 has a pair of notches 118 with which the detent 116 is engageable to hold the member 108 in either position, but to enable said member to be moved by the pressure fluid to the other position. The pipes 56 and 62 are connected to the casing 106 to communicate with the respective chambers 112' and 111' adjacent to the abutment 110, whereby the brake valve can be operated by the pressure fluid without it being possible for the engineer to stop the movement of the brake valve stem 107, as when a service application is being made.

Coming to the power interrupting means, the same is used for moving the throttle lever 119 (see Figure 4) or other controlling member to initial position, whereby to cut off the motive power, whether it be steam, electricity, gasoline or the like. As illustrated and described, however, the throttle lever 119 controls the flow of steam from the boiler to the engine, a stem 120 being connected to the lever 119 for operating the throttle valve (not shown). In order to assure of the movement of the throttle lever to cut off the flow of steam to the engine, the stem 120 extends through a cylinder 121 in which a piston 122 is movable, said piston being secured upon the stem 120 whereby when pressure fluid is admitted into the cylinder 121 at that end nearest the throttle lever, the piston 122 is moved away from said end to positively swing the throttle lever, even against the resistance of the engineer, to cut off the power. The means for controlling the flow of pressure fluid into the cylinder 121 embodies a body 123 assembled with the cylinder 121 and provided with a passage 124 communicating with the cylinder 121 for supplying pressure fluid thereto. A valve 125 is mounted for oscillation within the body 123 and intersects the passage 124, and a handle 126 is mounted loosely upon one protruding end of the valve 125, whereby said valve cannot ordinarily be operated by the handle 126 unless a proper key is used. Thus, a key barrel or receptacle 127 (see Figure 7) is assembled with the valve 125, and when a proper key 128 is inserted through the handle 126 into the barrel 127, the valve 125 can be operated by the handle 126. This key is in the possession of the conductor or other authorized person, in order that the valve 125 cannot be operated by the engineer. Under certain conditions, the conductor may see fit to permit the valve 125 to be operated in order that the train can proceed under caution conditions at a low rate of speed, but this is not possible unless the key 128 is used by the sanction of the conductor or other authorized person. The valve 125 has a port 129 (see Figure 4) normally registering with the passage 124, and a pipe 130 connected to the body 123 establishes communication between the passage 124 and the pipe 63 of the valve casing 6, whereby the air or pressure fluid can flow from the valve casing 6 into the cylinder 121 in case of emergency, for cutting off the power. The body 123 has another passage 131 connected by a pipe 132 with the pipes 63 and 130, so that the pressure fluid can also flow into the passage 131 under certain conditions. The passage 131 communicates with a chamber or auxiliary reservoir 133 with which the body 123 is provided, and the valve 125 has a port 134 normally out of registration with the passage 131 so that said passage is normally closed, but when the valve 125 is turned, the port 134 is brought into registration with the passage 131 to open it. A passage 135 in the body 123 is intersected by the valve 125 and communicates with the passage 131 between the valve 125 and chamber 133 and also communicates with the atmosphere, the valve 125 having a port 136 normally communicating with the passage 135. A bypass or passage 137 in the body 123 connects the passage 124 at opposite sides of the valve 125 and is intersected and normally closed by the valve 125, which has a port 138 to register with the by-pass 137 when the valve is turned, and an escape or discharge passage 146 in the body 123 communicates with the atmosphere at one end and with the passage 124 at its other end between the valve 125 and cylinder 121, the passage 146 being intersected and normally closed by the valve 125 which has a port 147 to register with the passage 146 when the valve is turned.

The speed limit controlling means or device is assembled with the power interrupting device just described, and for this purpose, the body 123 has a passage 139 communicating with the atmosphere at one end and intersected by the valve 125, said valve having a port 140 normally registering with the passage 139. The other end of the passage 139 communicates with a passage 141 in the body 123 to which the pipe 36 is connected, and a passage 142 in the body 123 connects the passage 141 and a passage 143 in said body which is in communication with the passage 131 and discharge passage 135. It will be stated at this point that in Figure 4, where the passages do not actually intersect, they are stopped at the opposite sides, so that it will be understood that the passages which cross one another are not in communication but extend across the other passages at one side thereof. A passage 145 in the body 123 communicates with the passage 144 and pipe 35 and opens into the atmosphere. A passage 148 in body 123 communicates at one end with the chamber 133 and at its other end with the pipe 45, and a passage 149 in said body communicates with the atmosphere and is normally intersected by the valve 125 which has a port 150 normally out of registration with the passage 149, so that said passage is normally closed, but when the valve is turned, the port 150 is brought into registration with the passage 149 to open it. The passage 149 communicates with a passage 151 in the body 123 which is in communication with the passage 124 between the valve 125 and cylinder 121. The passage 151 is also in communication with a cylinder 152 with which the body 123 is provided. The passage 151 communicates with one end of the cylinder 152 and the other end of the cylinder is in communication by way of a port or passage 153 in the body 123 with the passage 131 and passage 135. A valve rod 154 is slidable horizontally within the body 123 and extends through the cylinder 152, and also intersects the passage 148 at two points, as well as intersecting the passages 131, 137, 139, 142, 144, and 145. A piston 155 works within the cylinder 152 and is secured upon the rod 154, and a coiled wire compression spring 156 surrounds the rod 154 and is confined between the piston 155 and one end of the cylinder 152 to move the piston 155 and rod 154 to the position illustrated in Figure 4. The rod 154 has a pair of ports 157 to simultaneously register with the two portions of the passage 148 intersected by the rod 154 when said rod is moved to the right, as seen in Figure 4, the rod 154 normally closing the passage 148. Said rod 154 has a port 158 normally registering with and opening the passage 131 at that point, and has a port 159 to move into registry with the passage 137 when the rod 154 is moved to the right to open the passage 137 which is normally closed by the rod 154, and has a port 160 normally registering with the passage 139 to open it and movable into registration with the passage 142 when the rod 154 is moved to the right and has a port 161 normally registering with the passage 144 to open it, and movable into registration with the passage 145 to open it when the rod is moved to the right. The passages 148, 137, 142 and 145 are normally closed by the rod 154, and the passages 131, 139 and 144 are normally opened by said rod 154, whereas the contrary is true when the rod 154 is moved to the right.

The speed limit controlling device also includes a governor operated lever 162 fulcrumed at 163 to a suitable support, and connected as at 164 with the vertically slidable collar 165 of the governor 166 which has its shaft or spindle 167 connected in any suitable manner to one axle of the vehicle or train, in order that the governor 166 may be operated proportionally to the speed of the train, to raise the collar 165 and lever 162 as the speed is increased. It is preferable to connect the governor by gears 168 as well as a sprocket chain 169 to the axle of the vehicle, to assure of the operation of the governor even though one connecting means fails. The lever 162 carries a stop 170 against which the respective protruding end of the rod 154 is adapted to abut to prevent the movement of the rod 154 to the right, as seen in Figure 4, but the stop 170 is provided with a slot or recess 171 for receiving the rod 154 and permitting it to move to the right, when the speed of the train is increased above say eight or ten miles per hour, in which event the train which is proceeding under caution conditions, will again be brought to a stop.

The lever 162 has an arm 172 connected to an operating arm 173 of a speedometer 174 having a pointer 175 cooperating with a dial, to indicate the speed of the train, in order that the engineer may observe the speed regulations when proceeding under caution conditions.

The pneumatic signalling means is illustrated in Figure 1, and more in detail in Figure 15, and although the pipe 176 illustrated in Figure 15 is connected to the pipe 12 to illustrate a modification, the pipe 176 as shown in Figure 1, is connected to the pipe 63 whereby to receive live pressure fluid from the feed pipe 3 for operating the signals. Figure 15 can be referred to in connection with Figure 1, for the details of the signal mechanism. This mechanism includes a whistle 177 or other pressure fluid operated audible signal connected through the intervention of a valve 178 with the pipe 176, and a cylinder 179 connected to said pipe 176 at one end has a spring returned piston 180 working therein and connected to the valve 178 to open said valve when pressure fluid is admitted into the cylinder 179. When the pressure is relieved, the piston 180 returns to normal position to close the valve 178 whereby to stop the blowing of the whistle, which provides an audible alarm when pressure fluid is admitted into the pipe 176. A pressure gage 181 is connected to the pipe 176 to indicate the air pressure, and a cylinder 182 of a visual signal has one end connected to the pipe 176 and has a spring returned piston 183 working therein. This piston 183 has an upstanding stem 184 entering a signal case 185 provided with a window 186 exposing a white signal member within the case 185 which is illuminated by means of an electric or other suitable lamp (not shown). A signal member 187 colored red and of transparent material is carried by the stem 184 and is normally below the window 186, but when the pressure fluid is admitted into the cylinder 182, the piston 183 and signal member 187 are raised, to bring the signal member 187 behind the window 186 to obscure the white safety signal and bring the danger signal into position, in order that it can be observed by the engineer.

The relay used for controlling the motor circuits is illustrated in detail in Figure 11, and includes an angular casing 189 in which the magnet 105 is mounted in one arm thereof, while the armature switch 102 is mounted in the other arm. Said armature switch includes a tubular arm 190 having one end pivotally supported, as at 191, within the casing 189, and a yoke 192 is carried by the free end of the arm 190. An "on and off" switch 193 is mounted within the yoke 192 and the conductors 101 and 103 are connected to the switch 193 and extend through the arm 190. The switch 193 has opposite operating buttons 194 and 195, and a plate 196 is carried by the casing 189 for the contact of the button 194. The button or plunger 195 is adapted to contact with the pole piece or core 197 of the magnet 105, and the arm 190 is pulled downwardly by means of a spring 198 when the magnet 105 is deenergized. The button or plunger 195 extends through the armature 199 carried by the yoke 192. When the magnet 105 is energized and the armature 199 attracted, the arm 190 and its yoke 192 are raised, and the button 195 in contacting with the pole piece 197 will turn the switch 193 on to close the circuit between the conductors 101 and 103. When the magnet 105 is deenergized, the arm 190 and its yoke 192 are moved downwardly, and the button or plunger 194 in contacting with the plate 196 will turn the switch 193 to off position, thereby opening the circuit.

A modified form of relay is illustrated in Figure 12 wherein two electro magnets 105' connected in parallel are used, whereby to assure of the operation of the relay, since one magnet will be operable even if the other is not. Pairs of contacts 200 are provided, whereby to provide a multiple contact relay, to assure of one perfect contact.

Under normal or clear conditions, the engineer can manipulate the brake valve 4 (see Figures 1 and 2) as usual for applying and releasing the brakes, it being noted that the exhaust port of the valve 4 is connected (see Figure 3) by way of the pipe 8, passage 7, passage 9, port 14 and pipe 10 to the atmosphere, to permit the pressure fluid to bleed to the atmosphere from the brake pipe to apply the brakes. Therefore, as long as the rod 13 is in its lowermost position, the pressure fluid can be exhausted from the brake pipe. Pressure fluid from the feed pipe 3 flows by way of the pipe 18, passage 17, branch passage 19 and port 23 into the chamber 20 to supply said chamber with pressure fluid which is compressed therein. The governor arms 70 being raised due to the operation of the governor under normal conditions, due to the operation of one motor M, will result in the valve 31 being held in raised position with the passage 28 closed to confine the pressure fluid in the chamber 20, while the port 32 opens the passage 24 so that pressure fluid in the chamber 22 can flow through the pipe 25 and passage 24 into the upper end of the cylinder 16 for depressing the piston 15 whereby to retain the rod 13 in lowered position. Passages 21 and 60 are closed by the rod 13 under normal conditions. The upper end of cylinder 33 (see Figure 4) is normally connected to the atmosphere by way of the pipe 35, passage 144, port 161, passage 143, passage 131, passage 135 and port 136, whereby the rod 13 can move upwardly without interference, and the lower end of the cylinder 33 is normally connected to the atmosphere to enable the rod 13 to move downwardly without interference, this being provided by the pipe 36, passage 141, passage 139 and ports 160 and 140. Since the passage 38 (see Figure 3) establishes communication between the lower end of the cylinder 37 and the upper end of the cylinder 33 and pipe 35, the spring 44 will normally depress the piston 39 so that the port 43 registers with the passage 26. The left hand end of the cylinder 152 in Figure 4 is normally connected to the atmosphere by way of the port 153, passage 131, passage 135 and port 136, so that the piston 155 is moved to the left to hold the rod 154 in normal position. Pressure fluid which was previously stored in the chamber 46 flows through the passage 55 and port 58 into the pipe 56 and thence into the chamber 112' of the casing 106 whereby to move and hold the member 108 in the position illustrated in Figure 5, with the shoulder 111 contacting with the abutment 110. This enables the engineer to rotate the stem 107 to apply and release the brakes without interference. The chamber 111' is connected to the atmosphere to permit of such movement of the member 108, by way of the pipe 62, passage 61, port 64 and aperture or port 66. The foregoing conditions are normal when the track is clear and the motor circuit closed.

Should the vehicle or train enter a danger zone, so that the motor circuit is opened by the relay by any suitable track means, wireless apparatus, or the like, the motor M will stop, its brake band 86 (see Figure 3) being applied and the governor arms 70 will therefore drop immediately and lower the valve 31 so that it closes the passage 24 and opens the passage 28. The pressure fluid which is in chamber 20 will now flow through the passage 28, pipe 27 and passage 26 into the lower end of the cylinder 16 to raise the piston 15 and rod 13. When the rod 13 is raised, the passages 9 and 19 are closed thereby, and the ports 14 and 23 are brought into registration with the passages 11 and 21 to open them. The pressure fluid in being discharged from the brake pipe will now enter the passage 11 and pipe 12 instead of flowing into the pipe 10 and atmosphere, and the live pressure fluid from the feed pipe 3 will flow through the passage 21 instead of the passage 19, thereby supplying the chamber 22 with pressure fluid, the outlet passage 24 of the chamber 22 being closed by the valve 31. Passage 55 is also closed by the rod 13 when it is raised, and the port 58 is brought into registration with the passages 59, 60 and 61, so that pressure fluid is supplied from the passage 21 into the chamber 46 by way of the passage 60, port 58 and passage 59. Pressure fluid flows from the passage 60 into the passage 61 and pipe 62, being conducted into the chamber 111' of the casing 106 so as to rotate the member 108 toward the left, as seen in Figure 5, and the pressure is sufficient to actuate the stem 107 even against the resistance of the engineer, so that he cannot stop the application of the brakes when being automatically applied by the pneumatic means. The stem 107 is illustrated in Figure 5 as being in position to establish communication between the feed pipe 3 and brake pipe 5, and when the member 108 is rotated to the left, its lug 113 contacts with one end of the slot 114, thereby moving the stem 107 with the member 108 to rotate the stem 107 for providing a service application of the brakes, whereby the pressure fluid flows from the brake pipe into the pipe 8 and thence to the pipe 12 as above indicated. The movement of the member 108, however, does not stop the engineer from making an emergency application of the brakes, since the stem 107 can be turned further than the member 108 for this purpose. The brakes are thus automatically applied, and at the same time, the pressure fluid in flowing into the pipe 176 from the pipe 63 and passage 60 will operate the pneumatic signal mechanism for giving the alarm and notifying the engineer of the conditions. Pressure fluid also flows from the pipe 63 into the pipe 130 and passage 124, whereby the pressure fluid in flowing into the cylinder 121, will move the piston 122 to the left, as seen in Figure 4, thereby returning the throttle lever 119 to initial position, for cutting off the power. The train is therefore brought to a halt, but can proceed under caution conditions as will presently appear.

To proceed under caution conditions, at an allowed speed of say eight or ten miles per hour, the conductor or other authorized person in possession of the key 128 (see Figure 7) can insert the key into the barrel 127, in order that the handle or lever 126 can be swung for turning the valve 125 whereby to bring the ports 136 (see Figure 4), 140 and 129 out of registration with their passages, and to bring the other ports of said valve into registration with their passages. Communication between the pipes 130 and cylinder 121 is now cut off by the valve 125, so that pressure fluid no longer flows into the cylinder 121, and the pressure fluid can drain from said cylinder by way of the passage 124, passage 146 and port 147, permitting the throttle lever to be swung for applying the power. The rod 13 is moved downwardly to normal position, whereby the member 108 is returned to normal position (see Figures 3, 4 and 5). This is accomplished due to the movements of the valve 125 (see Figure 4), since the exhaust passage 135 which communicates with the upper end of the cylinder 33 will be closed by the valve 125, while the pressure fluid supply pipe 132 communicates through the port 134 with the passage 143 which is connected by way of the passage 144 and pipe 35 with the upper end of the cylinder 33, so that pressure fluid will flow into the upper end of said cylinder to force the piston 34 and rod 13 downwardly. The air in the lower end of the cylinder 33 is forced to the atmosphere by way of the pipe 36, passage 141, passage 139, port 160 and a restricted port 140′ in the valve 125 which is now in register with the passage 139.

Pressure fluid will also flow from the upper end of the cylinder 33 (see Figure 3) through the passage 38 into the lower end of the cylinder 37 thus raising the piston 39 and closing the passage 26, so that air cannot flow through the passage 26 from the chamber 20 into the lower end of the cylinder 16 to resist the downward movement of the rod 13 due to the depression of the piston 34 by the pressure fluid. The throttle lever 119 (see Figure 4) and engineer's brake valve can now be operated as before, to enable the train to proceed, but it will be noted that under these conditions, pressure fluid flows from the pipe 132 through the port 134 and port 153 into the left hand end of the cylinder 152, as seen in Figure 4, thereby tending to move the piston 155 and rod 154 toward the right, but this is normally prevented by the stop 170 as long as the governor 166 operates below a predetermined velocity, due to the slow movement of the train.

Should the engineer disregard caution conditions, and run the train at a greater speed than allowed, the stop 170 will be raised to such a position by the governor 166, that the rod 154 can enter the slot 170, pressure fluid in flowing into the cylinder 152 moving the piston 155 to move said rod. This will result in the train being stopped again, so that it will again be necessary for the key 128 to be employed for again starting the train under caution conditions. Thus, when the rod 154 is moved into the slot 170, the ports 157 are brought into registration with the passage 148, and pressure fluid previously supplied to the chamber 133 will flow through the passage 148 and pipe 45 into the upper end of the cylinder 37, thereby depressing the piston 39 and again opening the passage 26 (see Figure 3) so that pressure fluid can flow from the chamber 20 into the lower end of the cylinder 16 for raising the piston 15 to again move the rod 13 out of normal position. The air can flow from the lower end of the cylinder 37 (see Figure 4) through the passage 38 into the upper end of the cylinder 33, and from the upper end of the cylinder (to permit the piston 34 to move upwardly) by way of the pipe 35, passage 144 and passage 145 with which the port 161 now registers. Under these conditions, pressure fluid is also supplied to the lower end of the cylinder 33 to assist in raising the rod 13, since pressure fluid can flow from the pipe 132 through the port 134 into the passage 143 and thence by way of the passage 142 with which the port 160 now registers into the port 141 and pipe 36 leading to the lower end of the cylinder 33. The engineer's brake valve is therefore again automatically operated for applying the brakes, and at the same time, the throttle lever 119 is returned to initial position to cut off the power. This is accomplished by the flow of pressure fluid from the pipe 130 through the by-pass 137 with which the port 138 is now in registration, as well as the port 159, so that the pressure fluid can enter the cylinder 120 and move the piston 122 for returning the throttle lever, or stem in the manner set out in Figure 4.

To again permit the train to move, it is necessary for the key 128 to be used for turning the valve 125 to normal position, so that the left hand end of the cylinder 152 now communicates with the atmosphere by way of the port 153, passage 131, passage 135 and port 136, so that the spring 156 will move the rod 154 to normal position, thereby restoring conditions the same as they were when the train was first stopped. Now, by moving the valve 125 back to normal position, the train being stopped or moving below eight or ten miles an hour, caution conditions are again restored, and the train can proceed, but will again be stopped should the speed limit not be observed.

Figure 14 illustrates the controlling device or valve used without the speed limit controlling device, and in which event the lower end of the rod 13 is housed within a protecting cap or housing 33′ secured to the lower end of the casing 6.

In Figure 15, the signal pipe 176 is connected to the pipe 12 instead of the pipe 63, as well as the pipe 130, so that instead of line pressure fluid being used for operating the signals and power interrupting means, exhaust pressure fluid flowing from the pipe 12 is utilized for that purpose, when this is desired. Therefore, an exhaust port is provided in the power interrupting means, allowing the pressure fluid from the train line exhaust to pass to the atmosphere after closing off the propelling power, such as shown in my Patent No. 1,058,107, granted April 8, 1913, or in my co-pending application for patent on combination automatic and manual air brake system and automatic train control and signal system, Serial No. 59,615, referred to presently. It is preferable, however, in this instance, to connect the signal apparatus as shown in Figure 15, to the pipe 130

63, in order to be connected with live pressure fluid, for otherwise the reduction or exhaust pressure after the power propelling means was actuated would cause a clear signal under dangerous conditions.

The pipe 12 can also be used for connection with a throttle closing apparatus as shown in my co-pending application on combination automatic and manual air brake system and automatic train control and signalling mechanism, Serial No. 59,615, filed November 4, 1915.

Figure 16 illustrates a power interrupting and speed limit controlling means operating substantially the same as the devices illustrated in Figure 4, but the construction being of modified form. Thus, instead of having the body 123 with the various passages and valves, separate devices connected by pipes are employed. A pipe 124' is connected to the cylinder 121 and takes the place of the passage 124 in Figure 4, and similarly, the valve 125', handle or lever 126', pipe 130', pipe 131', pipe 132', chamber or reservoir 133', pipe 121', pipe 143', pipe 145', pipe 148', pipe 149', pipe 151', cylinder 152', rod 154', piston 155' and valve 160' take the place of the parts illustrated in Figure 4 having the same reference characters with the prime marks eliminated.

In Figure 17, the signal pipe 176 is connected to the pipe 63, while the power interrupting pipe 130 is connected to the passage 12 to receive the pressure fluid from the train pipe. A simple power interrupting means is disclosed, embodying the cylinder 121$^x$ supplied with pressure fluid from the pipe 130 to move the piston 122$^x$ and the piston rod 120$^x$ which is connected, as at 119$^x$, to the throttle lever 119 whereby to return the throttle lever to cut off the power. The cylinder 121$^x$ has an escape port 121$^z$ permitting the pressure fluid to flow to the atmosphere after the throttle has been returned to initial position, thus relieving the pressure. The signal system being connected with the live pressure fluid flowing through the pipe 63 will cause the signal device to remain at danger when automatically actuated until the obstacle of danger has been removed, which will in turn cause the relay to be closed, thereby causing the governor to operate and expand and allowing the piston rod 13 to return to normal position. This permits the pressure fluid to flow to the atmosphere by way of the port 57, allowing the pneumatic signal device to return to clear position. The chamber 29$^x$ is provided with a bowl-shaped bottom above which the weights of the governor work, and the relays, etc., can be located below the bowl. A suitable lamp L can be provided in the chamber 29$^x$ to illuminate the governor and motors, in order that they can be seen through a window or door with which the casing 6 can be provided for the observation of the engineer or operator.

Having thus described the invention, what is claimed as new is:

1. A vehicle controlling apparatus including a governor, an electrical motor for driving said governor, responsive means controlling the circuit of the motor, vehicle retarding means controlled by the governor, and electrical resistance in the circuit of the motor and controlled by the governor for decreasing the resistance in the circuit when the governor is accelerated in the starting thereof.

2. A vehicle controlling apparatus including a governor, a plurality of electric motors for driving the governor, a responsive switch, means for connecting said switch in the circuit of either motor, and vehicle retarding means controlled by the governor.

3. A vehicle controlling apparatus including a centrifugal governor, an electric motor for driving the governor, responsive means controlling the circuit of the motor, vehicle retarding means controlled by the governor, and a brake for the motor arranged to stop the motor and governor when the motor circuit is opened.

4. A vehicle controlling apparatus embodying the combination with an air brake equipment, of pressure fluid operated means operable in opposite directions under fluid pressure for controlling said equipment, means for conducting pressure fluid from said equipment to the pressure fluid operated means for operating it in one direction, a pressure fluid chamber connected to said pressure fluid operated means for supplying pressure fluid thereto to operate said means in the opposite direction, and controlling means operable when in one position for establishing the flow of pressure fluid from the equipment to the pressure fluid operated means and chamber and when in another position to establish communication between said chamber and pressure fluid operated means.

5. A vehicle controlling apparatus embodying the combination with an air brake equipment, of pressure fluid operated means operable in opposite directions under fluid pressure for controlling said equipment, means for conducting pressure fluid from said equipment to the pressure fluid operated means for operating it in one direction, a pressure fluid chamber connected to said pressure fluid operated means for supplying pressure fluid thereto to operate said means in the opposite direction, and an automatically operated valve operable when in one position for establishing the flow of pressure fluid from the equipment to the pressure fluid operated means and said chamber, and when in another position for establishing the flow of pressure fluid from said chamber to the pressure fluid operated means.

6. A vehicle controlling apparatus including vehicle retarding means having an oscillatory manually-operable member, and an automatic equipment for automatically operating said member including an oscillatory member connected with the firstnamed member to oscillate about the axis of the firstnamed member, a pneumatic chamber in which the secondnamed oscillatory member is movable for turning motion about said axis, and means for supplying pressure fluid to said chamber for moving the secondnamed member to operate the firstnamed member.

7. A vehicle controlling apparatus embodying the combination with an air brake equipment including feed and brake pipes and a brake valve therebetween, of pressure fluid operated means assembled with said valve and movable in opposite directions for operating said valve, means for conducting pressure fluid from the feed pipe to said pressure fluid operated means for operating it in one direction, a pressure fluid chamber for supplying pressure fluid to said pressure fluid operated means to operate it in the other direction, and means operable when in one position for establishing the flow of pressure fluid from the feed pipe to said pressure fluid operated means and chamber, and when in another position for establishing the flow of pressure fluid from said chamber to said pressure fluid operated means.

8. A vehicle controlling apparatus embodying the combination with an air brake equipment including feed and brake pipes and a brake valve therebetween, of pressure fluid operated means assembled with said valve and movable in opposite directions for operating said valve, means for conducting pressure fluid from the feed pipe to said pressure fluid operated means for operating it in one direction, a pressure fluid chamber for supplying pressure fluid to said pressure fluid operated means to operate it in another direction, and an automatically controlled valve operable when in one position for establishing the flow of pressure fluid from the feed pipe to said pressure fluid operated means and chamber, and when in another position for establishing the flow of pressure fluid from said chamber to said pressure fluid operated means.

9. A vehicle controlling apparatus embodying the combination with an air brake equipment including a brake valve having an operating member, pressure fluid operated means for operating said member and including a member having movement relative to the operating member for moving the fluid pressure operating means, means for moving the second mentioned member to its normal position, the first mentioned member being movable when the second mentioned member is in normal position to operate the brake valve, and a centrifugal governor control means for supplying pressure fluid to said pressure fluid operating means for moving the second named to move means for moving the second named means to move the first mentioned member to vehicle stopping position.

10. A vehicle controlling apparatus embodying the combination with an air brake equipment including a brake valve having an oscillatory operating member, of pressure fluid operated means assembled with the brake valve and including a member having limited oscillatory movement relative to the operating member, the second mentioned member when in normal position permitting the operating member to be oscillated for controlling the equipment, and means operable under clear conditions for supplying pressure fluid to said means for moving the second mentioned member to normal position and operable under emergency conditions for supplying pressure fluid to said means to move the second mentioned member away from normal position whereby to move the first mentioned member to train stopping position.

11. A vehicle controlling apparatus embodying the combination with an air brake equipment including a brake valve having an oscillatory stem, of means for automatically operating the brake valve including a casing assembled with the brake valve and through which the stem extends, an oscillatory member within the casing having limited movement relative to the stem, and means for oscillating said member in opposite directions, said member when in normal position permitting the stem to be oscillated for operating the valve.

12. A vehicle controlling apparatus embodying the combination with an air brake equipment including a brake valve having an oscillatory operating stem, of means for operating said valve including a casing assembled therewith and through which the stem extends, an oscillatory member within said casing having a portion engaging said stem and having limited oscillatory movement relative thereto, the casing having an abutment fitting said portion and providing opposite chambers between said abutment and member, and means for alternately supplying pressure fluid to said chambers for oscillating said member, said member when in normal position permitting the stem to be oscillated for operating the valve.

13. A vehicle controlling apparatus including an air brake valve having an oscillatory manually-operable member, and an automatic controlling equipment comprising an oscillatory member connected with the firstnamed member to oscillate about the axis of the firstnamed member, a pneumatic chamber in which the secondnamed member is mounted for turning movement about said axis, and pneumatic means for the supply of pressure fluid to said chamber for operating the secondnamed member.

14. A vehicle controlling apparatus embodying vehicle retarding means including an oscillatory manually-operable member, and an automatic controlling equipment including a casing assembled with said means and member, an oscillatory member disposed within the casing for oscillation about the axis of the firstnamed member and having a limited movement relatively to the firstnamed member, to permit the firstnamed member to be moved manually in a direction for retarding the vehicle, and means for oscillating the secondnamed member in opposite directions about said axis.

15. A vehicle controlling apparatus including automatic means operable for retarding the vehicle, permissive means controlling said means for enabling the vehicle to proceed, a means operable, when the permissive means is operated, and controlling the retarding means to again retard the vehicle, and speed controlled means for preventing the thirdnamed means from operating under certain speed conditions and permitting the thirdnamed means to operate under other speed conditions.

16. A vehicle controlling apparatus including automatic means operable for retarding the vehicle, permissive means controlling said means for enabling the vehicle to proceed, a releasable means tending to operate, when the permissive means is operated, and controlling when released the retarding means to again retard the vehicle, and means controlled by the speed of the vehicle for releasing the thirdnamed means under predetermined speed conditions.

17. A vehicle controlling apparatus including pneumatic means operable for retarding the vehicle, in combination with pneumatic permissive means controlling the first named means under permissive conditions after the vehicle has been retarded and operable automatically under certain speed conditions to again retard the vehicle.

18. A vehicle controlling apparatus embodying the combination with a fluid pressure equipment, and means operable for stopping the vehicle, of centrifugal governor control means for bringing the stopping means into operation, pressure fluid operated means controlling the second mentioned means a pressure fluid chamber, said chamber being supplied with pressure fluid from said equipment when the third mentioned means is in one position, and automatically controlled means for establishing communication between said chamber and the third mentioned means for moving it in one direction.

19. A vehicle controlling apparatus embodying the combination with a pressure fluid equipment, and means operable for stopping the vehicle, of means for bringing the stopping means into operation, pressure fluid operated means controlling the second mentioned means, a pair of pressure fluid chambers, said chambers being alternately supplied with pressure fluid from said equipment at the different positions of the pressure fluid operated means, and automatically controlled means for alternately establishing communication between said chambers and the pressure fluid operated means for moving it in opposite directions.

20. A vehicle controlling apparatus including automatic pneumatic means operable for retarding the vehicle, pneumatic permissive means adapted to be brought into operation for controlling the retarding means, and a governor operated according to vehicle speed controlling the permissive means according to vehicle speed.

21. A vehicle controlling apparatus embodying the combination with a pressure fluid equipment, and means operable for stopping the vehicle, of means for bringing the stopping means into operation, pressure fluid operated means controlling the second mentioned means and including a cylinder and piston working therein, a pair of pressure fluid chambers adapted to alternately receive pressure fluid from said equipment at the different positions of said piston, and automatically controlled means for alternately bringing said chambers into communication with the opposite ends of said cylinder.

22. A vehicle controlling apparatus embodying the combination with a pressure fluid equipment, and means operable for stopping the vehicle, of pressure fluid operated means for bringing the stopping means into operation, pressure fluid operated means for establishing the flow of pressure fluid from said equipment to the second mentioned means, a pressure fluid chamber adapted to reeceive pressure fluid from said equipment in one position of the third mentioneed means, and automatically controlled means for establishing communication between said chamber and third mentioned means to move the latter in one direction.

23. A vehicle controlling apparatus embodying the combination with a pressure fluid equipment, and means operable for stopping the vehicle, of pressure fluid operated means for bringing the stopping means into operation, pressure fluid operated means for establishing the flow of pressure fluid from said equipment to the second mentioned means, a pair of pressure fluid chambers adapted to alternately receive pressure fluid from said equipment at the different positions of the third mentioned means, and automatically controlled means for alternately establishing communication between said chambers and third mentioned means to move it in opposite directions.

24. A vehicle controlling apparatus embodying the combination with a pressure fluid equipment, and means operable for stopping the vehicle, of pressure fluid operated means for bringing the stopping means into operation, means for conducting pressure fluid from said equipment to the pressure fluid operated means, a valve controlling the flow of pressure fluid to the pressure fluid operated means, means for operating said valve including a cylinder and a piston working therein, a pair of pressure fluid chambers adapted to alternately receive pressure fluid from said equipment at the different positions of said valve, and automatically controlled means for alternately establishing the flow of pressure fluid from the chambers to the opposite ends of said cylinder.

25. A vehicle controlling apparatus embodying the combination with a pressure fluid equipment, and means operable for stopping the vehicle, of means for bringing the stopping means into operation, pressure fluid operated means supplied with pressure fluid from said equipment and controlling the second mentioned means, a pair of pressure fluid chambers alternately receiving pressure fluid from said equipment at the different positions of the pressure fluid operated means, means for conducting pressure fluid from said chambers to the pressure fluid operated means for moving it in opposite directions, a valve for alternately establishing communication between said chambers and pressure fluid operated means, and automatic means for operating said valve.

26. A vehicle controlling apparatus embodying the combination with a pressure fluid equipment, and means operable for stopping the vehicle, of pressure fluid operated means for bringing the stopping means into operation, means for conducting pressure fluid from said equipment to the pressure fluid operated means, a valve for controlling the flow of pressure fluid to the pressure fluid operated means, means for operating the valve including a cylinder and piston working therein, a pair of pressure fluid chambers adapted to alternately receive pressure fluid from said equipment at the different positions of said valve, means for conducting pressure fluid from said chambers to the opposite ends of said cylinder, a valve cooperating with the last mentioned means for alternately establishing communication between said chambers and the opposite ends of said cylinder, and automatic means operating the last mentioned valve.

27. A vehicle controlling apparatus including automatic pneumatic means operable for retarding the vehicle, pneumatic permissive means operable for controlling said retarding means and, when operative, having a tendency to control the retarding means for retarding the vehicle, and automatic controlling means for holding the second named means under certain conditions and for releasing same under other conditions.

28. A vehicle controlling apparatus embodying the combination with a pressure fluid equipment, of a valve controlling the flow of pressure fluid, a governor operating said valve, an electric motor for operating said governor, a rheostat operated by said governor, an electrical circuit including a source of energy and also including said motor and rheostat, the resistance of the rheostat being decreased as the governor is accelerated, and automatic means for opening the motor circuit.

29. A vehicle controlling apparatus embodying the combination with a pressure fluid equipment, of a valve controlling the flow of pressure fluid, a governor operating said valve, an electric motor for operating the governor, a brake for stopping the motor and governor, electrically operated means for normally releasing the brake, an electric circuit including a source of energy and also including said motor and electrically operated means, and automatic means for opening the circuit.

30. A vehicle controlling apparatus embodying the combination with a pressure fluid equipment, of a valve for controlling the flow of pressure fluid, a governor operating said valve, a pair of independent electric motors for operating the governor, a source of electrical energy and automatically operated circuit opening means, and means for connecting said source of energy and circuit opening means in circuit with either motor.

31. A vehicle controlling apparatus embodying the combination with a pressure fluid equipment, of a valve for controlling the flow of pressure fluid, a governor operating said valve, a pair of independent electric motors for operating said governor, a brake assembled with each motor for stopping the motor and governor, an electro magnet for releasing each brake, a rheostat for each motor and operated by the governor, a source of electrical energy, automatically operated circuit opening means, and means for connecting the source of energy and circuit opening means in circuit with either motor and corresponding electro magnet and rheo- 32. A vehicle controlling apparatus embodying power interrupting means, means operable for operating the power interrupting means to interrupt power, key operated means for releasing the power interrupting means, and speed limit controlling means brought into operation for preventing excess speed when the key operated means is operated.

33. A vehicle controlling apparatus embodying power interrupting means, means operable for operating the power interrupting means to interrupt power, key operated means for releasing the power interrupting means, and speed limit controlling means brought into operation when the key operated means is operated and operable in the event of excessive speed for again interrupting power.

34. A vehicle controlling apparatus embodying power interrupting means, means operable for operating the power interrupting means to interrupt power, key operated means for releasing the power interrupting means, means brought into operation when the key operated means is operated and tending to bring the power interrupting means into operation, and a governor for preventing the operation of the last mentioned means when the vehicle is traveling at a low rate of speed.

35. A vehicle controlling apparatus embodying pressure fluid operated power interrupting means, means operable for establishing the flow of pressure fluid to said power interrupting means to interrupt power, key operated means for cutting off the flow of pressure fluid to the power interrupting means, and speed limit controlling means brought into operation when the flow of pressure fluid is cut off by the key operated means for preventing excess speed.

36. A vehicle controlling apparatus embodying pressure fluid operated power interrupting means, means operable for establishing the flow of pressure fluid to said power interrupting means to interrupt power, key operated means for cutting off the flow of pressure fluid to the power interrupting means, and speed limit controlling means brought into operation when pressure fluid is cut off by the key operated means and operable upon the excessive speed of the vehicle for reestablishing the flow of pressure fluid to the power interrupting means.

37. A vehicle controlling apparatus embodying pressure fluid operated power interrupting means, means operable for establishing the flow of pressure fluid to said power interrupting means to interrupt power, key operated means for cutting off the flow of pressure fluid to the power interrupting means, means brought into operation when the key operated means is operated for cutting off the flow of pressure fluid and tending to move to position for re-establishing the flow of pressure fluid to the power interrupting means, and a governor preventing the movement of the last mentioned means when the vehicle is traveling at a low rate of speed.

38. A vehicle controlling apparatus embodying pressure fluid operated power interrupting means, means operable for establishing the flow of pressure fluid to the power interrupting means to interrupt power, key operated means operable for cutting off the flow of pressure fluid to the power interrupting means, and pressure fluid operated speed limit controlling means brought into operation when the key operated means is operated to cut off the flow of pressure fluid, for preventing excess speed.

39. A vehicle controlling apparatus embodying pressure fluid operated power interrupting means, means operable for establishing the flow of pressure fluid to the power interrupting means to interrupt power, key operated means operable for cutting off the flow of pressure fluid to the power interrupting means, and pressure fluid operated speed limit controlling means brought into operation when the key operated means is operated to cut off the flow of pressure fluid and operable for reestablishing the flow of pressure fluid to the power interrupting means should the vehicle exceed a predetermined speed.

40. A vehicle controlling apparatus embodying pressure fluid operated power interrupting means, means operable for establishing the flow of pressure fluid to the power interrupting means to interrupt power, key operated means for cutting off the flow of pressure fluid to the power interrupting means, pressure fluid operated means brought into operation when the key operated means is operated for cutting off the flow of pressure fluid and movable to reestablish the flow of pressure fluid to the power interrupting means, and a governor for preventing the operation of the last mentioned means unless a predetermined speed is exceeded.

41. A vehicle controlling apparatus embodying pressure fluid operated power interrupting means, a normally open valve through which pressure fluid flows to the power interrupting means, automatically operated means for establishing the flow of pressure fluid through said valve to the power interrupting means to interrupt power, key controlled means for moving said valve to cut off the flow of pressure fluid to the power interrupting means, and speed limit controlling means for preventing excess speed brought into operation when said valve is moved to cut off power.

42. A vehicle controlling apparatus embodying pressure fluid operated power interrupting means, a normally open valve through which pressure fluid flows to the power interrupting means, automatically operated means for establishing the flow of pressure fluid through said valve to the power interrupting means to interrupt power, key controlled means for moving said valve to cut off the flow of pressure fluid to the power interrupting means, and speed limit controlling means brought into operation when the valve is moved to cut off the flow of pressure fluid and operable for reestablishing the flow of pressure fluid to the power interrupting means should the vehicle exceed a predetermined speed.

43. A vehicle controlling apparatus embodying pressure fluid operated power interrupting means, a valve normally in position for the flow of pressure fluid therethrough to the power interrupting means, automatically operating means for establishing the flow of pressure fluid through said valve to the power interrupting means to interrupt power, a pressure fluid operated valve, key controlled means for moving the first mentioned valve to cut off the flow of pressure fluid to the power interrupting means, means whereby pressure fluid is admitted to the pressure fluid operated valve when the first mentioned valve is moved to cut off the flow of pressure fluid, a governor for preventing the movement of the pressure fluid operated valve unless the vehicle exceeds a predetermined speed, and means whereby when the pressure fluid operated valve is operated, the flow of pressure fluid to the power interrupting means is reestablished.

44. A vehicle controlling apparatus embodying an automatically operated controlling means, governor controlled means controlling the operation of said means, and key controlled means operable to also control the operation of the first mentioned means.

45. A vehicle controlling apparatus embodying an automatically operated controlling means, automatic means controlling the operation of said means, key controlled means for operating the first mentioned means, and means operated when the third mentioned means is operated for preventing the first mentioned means from being operated by the operation of the second mentioned means.

46. A vehicle controlling apparatus embodying an automatically operated controlling means, automatic means controlling the operation of said means, pressure fluid operated means for operating the first mentioned means, and key controlled means for controlling the supply of pressure fluid to the third mentioned means.

47. A vehicle controlling apparatus embodying an automatically operated controlling means, automatic means controlling the operation of said means, pressure fluid operated means for operating the first mentioned means, key controlled means for controlling the supply of pressure fluid to the third mentioned means, and pressure fluid operated means operated simultaneously with the third mentioned means for preventing the operation of the first mentioned means by the second mentioned means when the third mentioned means is operated.

48. A vehicle controlling apparatus embodying pressure fluid operated controlling means, automatically operated means controlling the flow of pressure fluid to said means, key controlled means for operating the first mentioned means and means operated when the third mentioned means is operated for preventing the flow of pressure fluid to the first mentioned means to operate it after being operated by the third mentioned means.

49. A vehicle controlling apparatus embodying pressure fluid operated controlling means, automatic means for controlling the flow of pressure fluid to said means, pressure fluid operated means for operating the first mentioned means, and key controlled means for controlling the supply of pressure fluid to the third mentioned means.

50. A vehicle controlling apparatus embodying a pressure fluid controlling valve movable from normal position to another position for stopping the vehicle, pressure fluid operated means for operating said valve, means for supplying pressure fluid to said means, automatically operated means for controlling the flow of pressure fluid to the first mentioned means, pressure fluid operated means independent of the aforesaid means for operating said valve to restore it to normal position, and key controlled means controlling the second mentioned pressure fluid operated means.

51. A vehicle controlling apparatus embodying a pressure fluid controlling valve movable from normal position to another position for stopping the vehicle, pressure fluid operated means for operating said valve, means for supplying pressure fluid to said means, automatically operated means for controlling the flow of pressure fluid to the first mentioned means, pressure fluid operated means independent of the aforesaid means for operating said valve to restore it to normal position, key controlled means controlling the second mentioned pressure fluid operated means, and pressure fluid operated means operated simultaneously with the second mentioned pressure fluid operated means for preventing the flow of pressure fluid to the first mentioned pressure fluid operated means when the valve is returned to normal position.

52. A vehicle controlling apparatus embodying the combination with an air brake equipment having a brake valve, of power interrupting means, means for operating the brake valve, a centrifugal governor control means for operating the power interrupting means, and key controlled means for releasing the brake valve and power interrupting means as and for the purpose described.

53. A vehicle controlling apparatus embodying the combination with an air brake equipment having a brake valve, of power interrupting means, means for operating the brake valve, means for operating the power interrupting means, controlling means operable automatically for bringing the second and third mentioned means into operation, and key operated means for releasing the power interrupting means and returning the controlling means to normal position.

54. A vehicle controlling apparatus embodying the combination with an air brake equipment having a brake valve, of power interrupting means, means for operating the brake valve, means for operating the power interrupting means, key controlled means for releasing the power interrupting means and brake valve, and speed limit controlling means brought into operation when the key operated means is operated and operable to prevent the excessive releasing movement of the power interrupting means and also operable for again bringing the brake valve operating means into operation in the event of excessive speed.

55. A vehicle controlling apparatus embodying the combination with an air brake equipment having a brake valve, of power interrupting means, means for operating the brake valve, means for operating the power interrupting means, controlling means operable when in normal position for releasing the brake valve and power operating means and operable automatically for bringing the second and third mentioned means into operation, and key controlled means operable when the controlling means is in second mentioned position for releasing the power interrupting means and for restoring the controlling means to normal position.

56. A vehicle controlling apparatus embodying the combination with an air brake equipment having a brake valve, of power interrupting means, means for operating the brake valve, means for operating the power interrupting means, controlling means operable when in normal position for releasing the brake valve and power operating means and operable automatically for bringing the second and third mentioned means into operation, key controlled means operable when the controlling means is in second mentioned position for releasing the power interrupting means and for restoring the controlling means to normal position, and speed limit controlling means brought into operation when the key controlled means is operated for releasing the power interrupting means and for again moving the controlling means to second mentioned position in the event of excessive vehicle speed.

57. A vehicle controlling apparatus embodying the combination with an air brake equipment having a brake valve, of pressure fluid operated power interrupting means, pressure fluid operated means for operating the brake valve, automatic controlling means for establishing the flow of pressure fluid to the power interrupting and brake operating means, and key controlled means for shutting off the flow of pressure fluid to the power interrupting means and for restoring the controlling means to normal position.

58. A vehicle controlling apparatus embodying the combination with an air brake equipment having a brake valve, of pressure fluid operated power interrupting means, pressure fluid operated means for operating the brake valve, automatic controlling means for establishing the flow of pressure fluid to the power interrupting and brake operating means, key controlled means for shutting off the flow of pressure fluid to the power interrupting means and for restoring the controlling means to normal position, and speed limit controlling means brought into operation when the key controlled means is operated for reestablishing the flow of pressure fluid to the power interrupting means in the event of excessive vehicle speed and for operating the controlling means to reestablish the flow of pressure fluid.

59. A vehicle controlling apparatus embodying the combination with an air brake equipment including a brake valve, of pressure fluid power interrupting means, pressure fluid operated means for operating the brake valve, automatically operated controlling means for establishing the flow of pressure fluid to the power interrupting and brake valve operating means, when moved from normal to another position, a valve for cutting off the flow of pressure fluid to the power interrupting means, key controlled means for operating said valve, pressure fluid operated means brought into operation when said valve is moved to cut off the flow of pressure fluid and operable when moved from normal to another position for reestablishing the flow of pressure fluid to the power interrupting means, a governor for preventing the movement of the fourth mentioned means unless the vehicle exceeds a predetermined speed, and pressure fluid operated means for returning the controlling means to normal position when said valve is operated to cut off the flow of pressure fluid and for returning the controlling means to its other position when the fourth mentioned means is moved from normal to its other position.

60. A vehicle controlling apparatus embodying in combination, a pressure fluid equipment including an engineer's brake valve having a rotary valve member provided with an extended stem, a rotary member for operating said stem, and supplied with pressure fluid from said equipment, and a governor controlled valve controlling the flow of pressure fluid to said second mentioned member in both the operative and inoperative positions to move said member in opposite directions.

61. A vehicle controlling apparatus embodying a pressure fluid equipment, having an engineer's brake valve including a rotary valve member having an extended stem, a pressure fluid operated member connected to said stem for rotating it in opposite directions, a valve for controlling a flow to said pressure fluid operated member, and a governor controlling the last mentioned valve to move said pressure fluid operated member in opposite directions when the governor is operative and inoperative.

62. A vehicle controlling apparatus including automatic pneumatic means operable for retarding the vehicle, permissive means controlling said means for enabling the vehicle to proceed, pneumatic means tending to operate, when the permissive means is operated, and controlling when released the retarding means to again retard the vehicle, and means controlled by the speed of the vehicle and controlling the thirdnamed means according to speed conditions.

63. A vehicle controlling apparatus including pneumatic vehicle retarding means, automatic means controlling said means, pneumatic means for controlling the retarding means, a permissive valve for stopping control of the retarding means by the secondnamed means and for bringing the thirdnamed means into operation, and automatic means controlling the thirdnamed means for the retarding of the vehicle according to predetermined conditions.

64. A vehicle controlling apparatus including pneumatic means operable for retarding the vehicle, automatic means controlling said means, pneumatic means for controlling the retarding means, a permissive valve for removing the control of the retarding means from the secondnamed means and for bringing the thirdnamed means into operation to control the retarding means, and means controlled according to vehicle speed and controlling the third named means.

65. A vehicle controlling apparatus including pneumatic means for retarding the vehicle, automatic means for controlling said means, pneumatic means operable when released for controlling the retarding means to retard the vehicle, a permissive valve for removing the control of the retarding means from the secondnamed means and for bringing the thirdnamed means into operation, and a governor operable according to vehicle speed and preventing the release of the thirdnamed means below a predetermined speed of the vehicle.

66. A vehicle controlling apparatus embodying power controlling means, a centrifugal governor providing gravity operated means controlling said power controlling means, traffic controlled means for controlling the gravity operated means, and means controlled by said gravity operated means to permit the operator of the vehicle to manipulate said power controlling means when not being automatically actuated, substantially as and for the purpose described.

67. A vehicle controlling apparatus embodying a source of pressure fluid, a pressure fluid operated means for indicating danger and retarding the vehicle connected to said source, two valves between said source and means, the one nearest said means normally shutting off the flow to said means and the other valve permitting such flow when in normal position and being operable by hand to shut off such flow under caution conditions, means operated by pressure fluid from said source when the secondnamed valve is in caution position to reestablish the flow to said pressure fluid operated means, and a governor preventing the operation of the lastnamed means when the vehicle moves at a speed below a predetermined speed.

68. A vehicle controlling apparatus embodying a source of pressure fluid, pressure fluid operated means for indicating danger and retarding the vehicle connected to said source, a main controlling valve normally shutting off the flow of fluid from said source to said retarding means and controlled by automatic means from the track, and speed control means between said valve and source including a caution valve operable to caution position to shut off the flow of fluid to said controlling valve, a second valve for reestablishing such flow when permitted to move, pressure fluid operated means for moving said second valve connected with said source to the caution valve when in caution position, to reestablish such flow, and a governor operated according to the speed of the vehicle and having a detent for preventing movement of said second valve unless the vehicle exceeds an allotted speed.

69. A vehicle controlling apparatus embodying a source of pressure fluid, pressure fluid operated means for indicating danger and retarding the vehicle connected to said source, two valves between said source and means, the one nearest said means normally shutting off the flow to said means and the other valve permitting such flow when in normal position and being operable by hand to shut off such flow in caution conditions, means operated by pressure fluid from said source when the secondnamed valve is in caution position to reestablish the flow to said pressure fluid operated means, and a governor preventing the operation of the lastnamed means when the vehicle moves below a predetermined speed.

70. A vehicle controlling apparatus including a centrifugal governor, means for driving the governor, responsive means for stopping the driving of the governor independent of the motion of the vehicle, pneumatic vehicle controlling means, and a valve controlling the lastnamed means and connected operatively with the governor to be directly actuated by the governor, whereby the gravity action of the governor when the governor stops will change the position of the valve.

In testimony that I claim the foregoing as my own, I have hereto affixed my signature in the presence of two witnesses.

ALFRED L. RUTHVEN.

Witnesses:
EVELYN A. RUTHVEN,
A. A. HOESTERMANN.

DISCLAIMER 1,470,107.—*Alfred L. Ruthven*, Buffalo, N. Y. COMBINATION AUTOMATIC AND MANUALLY-OPERABLE AIR BRAKE, POWER CONTROL, AND ALARM SYSTEM. Patent dated October 9, 1923. Disclaimer filed February 28, 1938, by the assignee, *Edward W. Parlee*.

Hereby enters this disclaimer to claim 11 of the specification.
[*Official Gazette April 12, 1938.*]